United States Patent
Hoke et al.

(10) Patent No.: US 11,143,407 B2
(45) Date of Patent: Oct. 12, 2021

(54) COMBUSTOR WITH AXIAL STAGING FOR A GAS TURBINE ENGINE

(71) Applicant: United Technologies Corporation, Hartford, CT (US)

(72) Inventors: James B. Hoke, Tolland, CT (US); Randal G. McKinney, Ellington, CT (US); Albert K. Cheung, East Hampton, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1384 days.

(21) Appl. No.: 14/895,784

(22) PCT Filed: Jun. 11, 2014

(86) PCT No.: PCT/US2014/041942
§ 371 (c)(1),
(2) Date: Dec. 3, 2015

(87) PCT Pub. No.: WO2014/201135
PCT Pub. Date: Dec. 18, 2014

(65) Prior Publication Data
US 2016/0123596 A1    May 5, 2016

Related U.S. Application Data

(60) Provisional application No. 61/833,707, filed on Jun. 11, 2013.

(51) Int. Cl.
*F23R 3/34* (2006.01)
*F23R 3/06* (2006.01)
(Continued)

(52) U.S. Cl.
CPC .............. *F23R 3/346* (2013.01); *F23R 3/002* (2013.01); *F23R 3/06* (2013.01); *F23R 3/14* (2013.01);
(Continued)

(58) Field of Classification Search
CPC .... F23R 3/34; F23R 3/346; F23R 3/06; F23R 3/50; F23R 3/002
See application file for complete search history.

(56) References Cited

U.S. PATENT DOCUMENTS 728,989 A    5/1903   Schmidt et al.
3,872,664 A    3/1975   Lohmann et al.
(Continued)

FOREIGN PATENT DOCUMENTS

EP    259758 A2    3/1988
EP    314112 A1    5/1989
(Continued)

OTHER PUBLICATIONS

EP search report for EP14811456.4 dated Jun. 7, 2016.
Office action for EP14811456.4 dated Dec. 18, 2018.

*Primary Examiner* — Thomas P Burke
(74) *Attorney, Agent, or Firm* — Getz Balich LLC

(57) ABSTRACT

A combustor a gas turbine engine includes an axial fuel injection system in communication with a combustion chamber, the axial fuel injection system operable to supply between about 10%-35% of a combustion airflow. A radial fuel injection system communicates with the combustion chamber downstream of the axial fuel injection system, where the radial fuel injection system is operable to supply between about 30%-60% of the combustion airflow. A multiple of dilution holes are in communication with a combustion chamber downstream of said radial fuel injection system, where the multiple of dilution holes are oper- (Continued)

able to supply between about 5%-20% of the combustion airflow.

20 Claims, 18 Drawing Sheets

(51) Int. Cl.
　　*F23R 3/14*　　　(2006.01)
　　*F23R 3/50*　　　(2006.01)
　　*F23R 3/00*　　　(2006.01)
　　*F23R 3/42*　　　(2006.01)
(52) U.S. Cl.
　　CPC ............. *F23R 3/34* (2013.01); *F23R 3/42* (2013.01); *F23R 3/50* (2013.01); *Y02T 50/60* (2013.01)

(56) References Cited

U.S. PATENT DOCUMENTS

| | | | |
|---|---|---|---|
| 4,048,797 | A | 9/1977 | Hakluyit et al. |
| 4,910,957 | A | 3/1990 | Moreno et al. |
| 4,928,481 | A * | 5/1990 | Joshi ................ F23R 3/346 60/737 |
| 5,003,768 | A | 4/1991 | Kappler et al. |
| 5,013,236 | A | 5/1991 | Khinkis |
| 5,054,280 | A | 10/1991 | Ishibashi et al. |
| 5,069,029 | A | 12/1991 | Kuroda et al. |
| 5,277,021 | A * | 1/1994 | Shekleton ............ F23R 3/045 60/752 |
| 5,285,628 | A | 2/1994 | Korenberg |
| 5,285,635 | A | 2/1994 | Savelli et al. |
| 5,319,935 | A | 6/1994 | Toon et al. |
| 5,321,949 | A | 6/1994 | Napoli et al. |
| 5,394,688 | A | 3/1995 | Amos |
| 5,402,634 | A | 4/1995 | Marshall |
| 5,406,799 | A | 4/1995 | Marshall |
| 5,465,570 | A | 11/1995 | Szillat et al. |
| 5,475,979 | A | 12/1995 | Oag et al. |
| 5,487,275 | A | 1/1996 | Borkowicz et al. |
| 5,551,228 | A | 9/1996 | Mick et al. |
| 5,623,819 | A | 4/1997 | Bowker et al. |
| 5,628,192 | A | 5/1997 | Hayes-Bradley et al. |
| 5,749,219 | A * | 5/1998 | DuBell .................. F02C 7/26 60/733 |
| 5,797,267 | A | 8/1998 | Richards |
| 5,802,854 | A | 9/1998 | Maeda et al. |
| 5,836,164 | A | 11/1998 | Tsukahara et al. |
| 5,862,668 | A | 1/1999 | Richardson |
| 5,970,716 | A | 10/1999 | Forrester et al. |
| 6,047,550 | A | 4/2000 | Beebe |
| 6,105,360 | A | 8/2000 | Willis |
| 8,112,216 | B2 | 2/2012 | Davis, Jr. et al. |
| 8,176,739 | B2 | 5/2012 | Evulet et al. |
| 8,196,407 | B2 | 6/2012 | Harris et al. |
| 8,220,269 | B2 | 7/2012 | Poyyapakkam |
| 2001/0004515 | A1 | 6/2001 | Scarinci et al. |
| 2002/0017101 | A1 | 2/2002 | Schilling et al. |
| 2002/0020173 | A1 | 2/2002 | Varney |
| 2002/0172904 | A1 | 11/2002 | Freeman et al. |
| 2003/0167771 | A1 | 9/2003 | Hayashi et al. |
| 2004/0006990 | A1 | 1/2004 | Stuttaford et al. |
| 2004/0011058 | A1 | 1/2004 | Baudoin et al. |
| 2004/0021235 | A1 | 2/2004 | Corr et al. |
| 2004/0055307 | A1 | 3/2004 | Knoepfel |
| 2004/0177615 | A1 | 9/2004 | Martling |
| 2004/0206090 | A1 | 10/2004 | Yee et al. |
| 2004/0211186 | A1 | 10/2004 | Stuttaford et al. |
| 2004/0216462 | A1 | 11/2004 | Hellat et al. |
| 2004/0226300 | A1 | 11/2004 | Stuttaford et al. |
| 2005/0229604 | A1 | 10/2005 | Chen |
| 2006/0005542 | A1 | 1/2006 | Campbell et al. |
| 2006/0156735 | A1 | 7/2006 | Laster et al. |
| 2007/0028618 | A1 | 2/2007 | Hsiao et al. |
| 2007/0089419 | A1 * | 4/2007 | Matsumoto ............ F23R 3/06 60/737 |
| 2007/0125093 | A1 * | 6/2007 | Burd ................... F23R 3/04 60/804 |
| 2007/0256416 | A1 * | 11/2007 | Dodo ................... F23R 3/14 60/737 |
| 2009/0113893 | A1 | 5/2009 | Li et al. |
| 2010/0162710 | A1 * | 7/2010 | Senior ................ F23R 3/286 60/737 |
| 2010/0170252 | A1 | 7/2010 | Venkataraman et al. |
| 2010/0287941 | A1 | 11/2010 | Kim et al. |
| 2011/0067402 | A1 | 3/2011 | Wiebe et al. |
| 2011/0091829 | A1 | 4/2011 | Barve et al. |
| 2012/0073305 | A1 | 3/2012 | Knopfel et al. |
| 2012/0110974 | A1 | 5/2012 | Davis, Jr. et al. |
| 2012/0164589 | A1 | 6/2012 | Wehe et al. |
| 2012/0186256 | A1 | 7/2012 | Dai et al. |
| 2012/0186258 | A1 | 7/2012 | Dai et al. |
| 2012/0186262 | A1 | 7/2012 | Hoke |
| 2012/0186264 | A1 | 7/2012 | Hoke |
| 2012/0304649 | A1 | 12/2012 | Matsuyama et al. |

FOREIGN PATENT DOCUMENTS

| | | |
|---|---|---|
| EP | 319246 A2 | 6/1989 |
| EP | 491478 A1 | 6/1992 |
| EP | 2206964 A2 | 7/2010 |
| EP | 2434218 A1 | 3/2012 |
| EP | 2434222 A1 | 3/2012 |
| EP | 2479497 A1 | 7/2012 |
| EP | 2479498 A2 | 7/2012 |
| EP | 2481982 A1 | 8/2012 |
| EP | 2481987 A2 | 8/2012 |
| GB | 2303439 A | 2/1997 |
| GB | 2377973 A | 1/2003 |
| GB | 2432206 A | 5/2007 |
| JP | S61140722 | 6/1986 |
| JP | 2000274689 | 10/2000 |
| JP | 2001263095 | 9/2001 |
| WO | WO2008129652 A1 | 10/2008 |

* cited by examiner

COMBUSTOR WITH AXIAL STAGING FOR A GAS TURBINE ENGINE

CROSS-REFERENCE TO RELATED APPLICATION

This application claims priority to PCT Patent Application No. PCT/US14/41942 filed Jun. 11, 2014, which claims priority to U.S. Patent Appln. Ser. No. 61/833,707 filed Jun. 11, 2013, which are hereby incorporated herein by reference in their entireties.

BACKGROUND

The present disclosure relates generally to a gas turbine engine and, more particularly, to a combustor section therefore.

Gas turbine engines, such as those which power modern commercial and military aircrafts, include a compressor for pressurizing a supply of air, a combustor for burning a hydrocarbon fuel in the presence of the pressurized air, and a turbine for extracting energy from the resultant combustion gases. The combustor generally includes radially spaced apart inner and outer liners that define an annular combustion chamber therebetween. Arrays of circumferentially distributed combustion air holes penetrate multiple axial locations along each liner to radially admit the pressurized air into the combustion chamber. A plurality of circumferentially distributed fuel injectors axially project into a forward section of the combustion chamber to supply the fuel for mixing with the pressurized air.

Combustion of hydrocarbon fuel in the presence of pressurized air may produce nitrogen oxide ($NO_x$) emissions that may be subject to relatively stringent controls by regulatory authorities, and thus may be sought to be minimized.

SUMMARY

A combustor for a gas turbine engine is provided according to one disclosed non-limiting embodiment of the present disclosure. This combustor includes an axial fuel injection system in communication with a combustion chamber. The axial fuel injection system is operable to supply between about ten percent (10%) and about thirty-five percent (35%) of a combustion airflow. The combustor also includes a radial fuel injection system that communicates with the combustion chamber downstream of the axial fuel injection system. The radial fuel injection system is operable to supply between about thirty percent (30%) and about sixty percent (60%) of the combustion airflow. A multiple of dilution holes are in communication with a combustion chamber downstream of the radial fuel injection system. The multiple of dilution holes are operable to supply between about five percent (5%) and about twenty percent (20%) of the combustion airflow.

In a further embodiment of the present disclosure includes, the radial fuel injection system may be radially outboard and/or radially inboard of the combustion chamber.

In a further embodiment of any of the foregoing embodiments of the present disclosure, the radial fuel injection system may include a multiple of non-fueled mixers.

In a further embodiment of any of the foregoing embodiments of the present disclosure, the radial fuel injection system may be radially outboard of the combustion chamber.

In a further embodiment of any of the foregoing embodiments of the present disclosure, the combustion chamber may be defined between an inner liner and an outer liner.

In a further embodiment of any of the foregoing embodiments of the present disclosure, a forward assembly may be included between the inner liner and the outer liner. The forward assembly may include a bulkhead liner that defines a bulkhead height. The radial fuel injection system may be axially spaced between fifty percent (50%) and one hundred and fifty percent (150%) of the bulkhead height aft of the bulkhead liner.

In a further embodiment of any of the foregoing embodiments of the present disclosure, a forward assembly may be included between the inner liner and the outer liner. The forward assembly may include a bulkhead liner that defines a bulkhead height. The inner liner and the outer liner radially spaced, between about one hundred percent (100%) to about two hundred percent (200%) of the bulkhead height axially proximate to the radial fuel injection system.

In a further embodiment of any of the foregoing embodiments of the present disclosure, a forward assembly may be included between the inner liner and the outer liner. The forward assembly may include a bulkhead liner that defines a bulkhead height. The axial fuel injection system may include a multiple of forward fuel nozzles and the radial fuel injection system includes a multiple of radial fuel nozzles. The multiple of radial fuel nozzles may be spaced between about twenty-five percent (25%) and about one hundred percent (100%) of the bulkhead height apart circumferentially.

In a further embodiment of any of the foregoing embodiments of the present disclosure, the axial fuel injection system may include a multiple of forward fuel nozzles. The radial fuel injection system may include a multiple of radial fuel nozzles. The multiple of circumferentially may be arranged forward fuel nozzles circumferentially in-line with respect to the multiple of radial fuel nozzle.

In a further embodiment of any of the foregoing embodiments of the present disclosure, the axial fuel injection system may include a multiple of forward fuel nozzles. The radial fuel injection system may include a multiple of radial fuel nozzles. The multiple of circumferentially arranged forward fuel nozzles may be circumferentially offset with respect to the multiple of radial fuel nozzle.

In a further embodiment of any of the foregoing embodiments of the present disclosure, a forward combustion zone may be defined forward of the radial fuel injection system. A downstream combustion zone may be defined aft of the radial fuel injection system. The forward combustion zone may define about twenty percent (20%) to about fifty percent (50%) of a total volume of the combustor chamber. The downstream combustion zone may define about fifty percent (50%) to about eighty percent (80%) of the total volume of the combustor chamber.

In a further embodiment of any of the foregoing embodiments of the present disclosure, a forward combustion zone may be defined forward of the radial fuel injection system. A downstream combustion zone may be defined aft of the radial fuel injection system. The downstream combustion zone may form an axial length of about one hundred percent (100%) to about two hundred and fifty percent (250%) a height of the combustion chamber proximate the radial fuel injection system.

In a further embodiment of any of the foregoing embodiments of the present disclosure, the axial fuel injection system may include a multiple of forward fuel nozzles each surrounded by a swirler. The radial fuel injection system may include a multiple of radial fuel nozzles each surrounded by a mixer.

A combustor for a gas turbine engine is provided according to another disclosed non-limiting embodiment of the present disclosure. This combustor includes an axial fuel injection system in communication with a combustion chamber and a radial fuel injection system that communicates with the combustion chamber downstream of the axial fuel injection system to define a forward combustion zone forward of the radial fuel injection system and a downstream combustion zone aft of the radial fuel injection system. The forward combustion zone defines about twenty percent (20%) to about fifty percent (50%) of a total volume of the combustor chamber and the downstream combustion zone defines about fifty percent (50%) to about eighty percent (80%) of the total volume of the combustor chamber.

In a further embodiment of any of the foregoing embodiments of the present disclosure, the downstream combustion zone may form an axial length of about one hundred percent (100%) to about two hundred and fifty percent (250%) a radial height of the combustion chamber proximate the radial fuel injection system.

In a further embodiment of any of the foregoing embodiments of the present disclosure, the axial fuel injection system may be operable to supply between about ten percent (10%) and about thirty-five percent (35%) of a combustion airflow and the radial fuel injection system is operable to supply between about thirty percent (30%) and about sixty percent (60%) of the combustion airflow.

In a further embodiment of any of the foregoing embodiments of the present disclosure, a multiple of dilution holes may be included in communication with a combustion chamber downstream of the radial fuel injection system. The multiple of dilution holes may be operable to supply between about five percent (5%) and about twenty percent (20%) of the combustion airflow.

A combustor for a gas turbine engine is provided according to another disclosed non-limiting embodiment of the present disclosure. This combustor includes an axial fuel injection system in communication with a combustion chamber and a radial fuel injection system that communicates with the combustion chamber downstream of the axial fuel injection system to define a forward combustion zone forward of the radial fuel injection system and a downstream combustion zone aft of the radial fuel injection system. The downstream combustion zone forms an axial length of about one hundred percent (100%) to about two hundred and fifty percent (250%) a radial height of the combustion chamber proximate the radial fuel injection system.

In a further embodiment of any of the foregoing embodiments of the present disclosure, a multiple of dilution holes are in communication with a combustion chamber downstream of the radial fuel injection system. The multiple of dilution holes may be operable to supply between about five percent (5%) and about twenty percent (20%) of the combustion airflow.

In a further embodiment of any of the foregoing embodiments of the present disclosure, the axial fuel injection system may be operable to supply between about ten percent (10%) and about thirty-five percent (35%) of a combustion airflow. The radial fuel injection system may be operable to supply between about thirty percent (30%) and about sixty percent (60%) of the combustion airflow.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
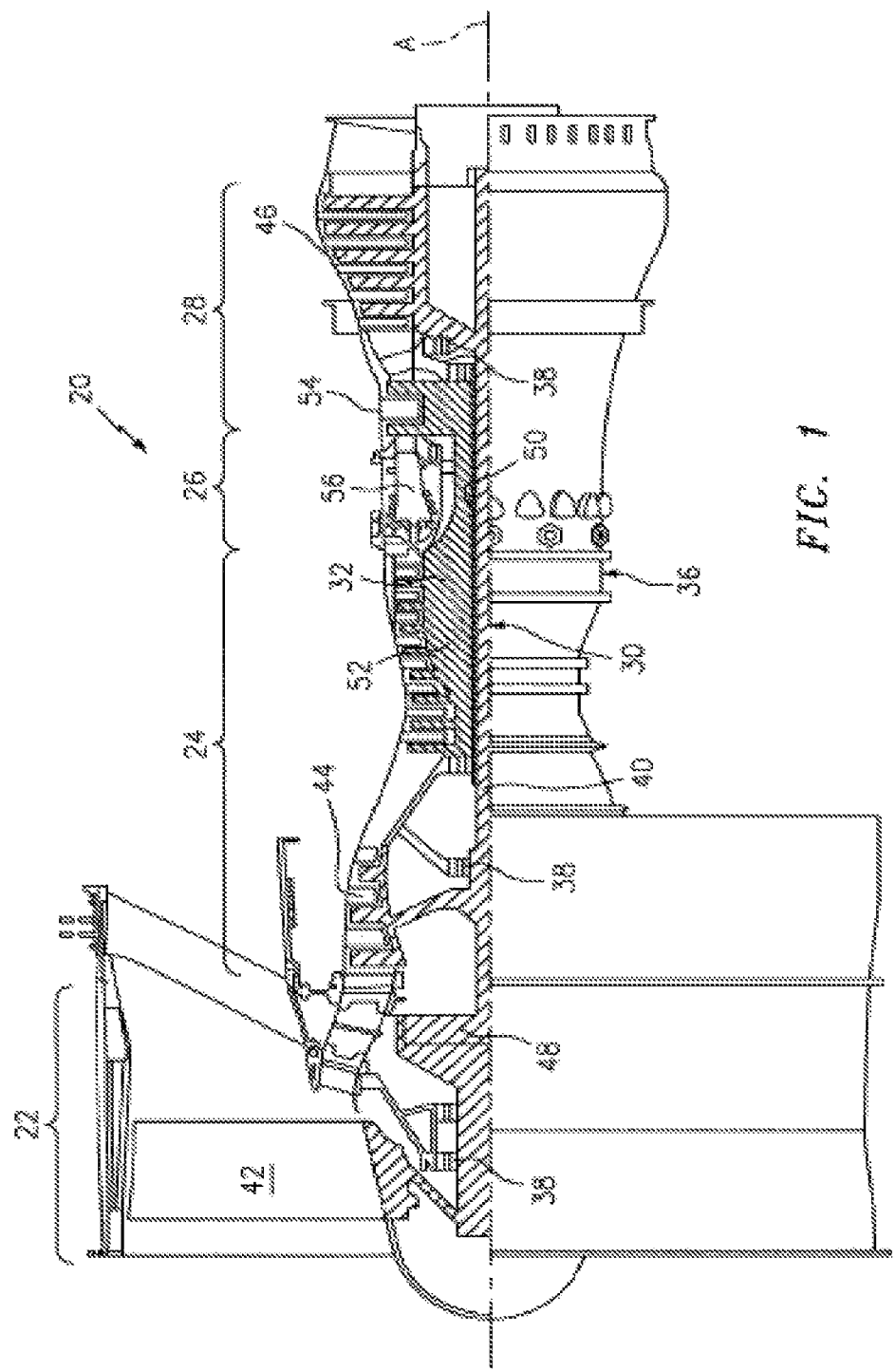
FIG. 1 is a schematic cross-section of an example gas turbine engine architecture.
Figure 2:
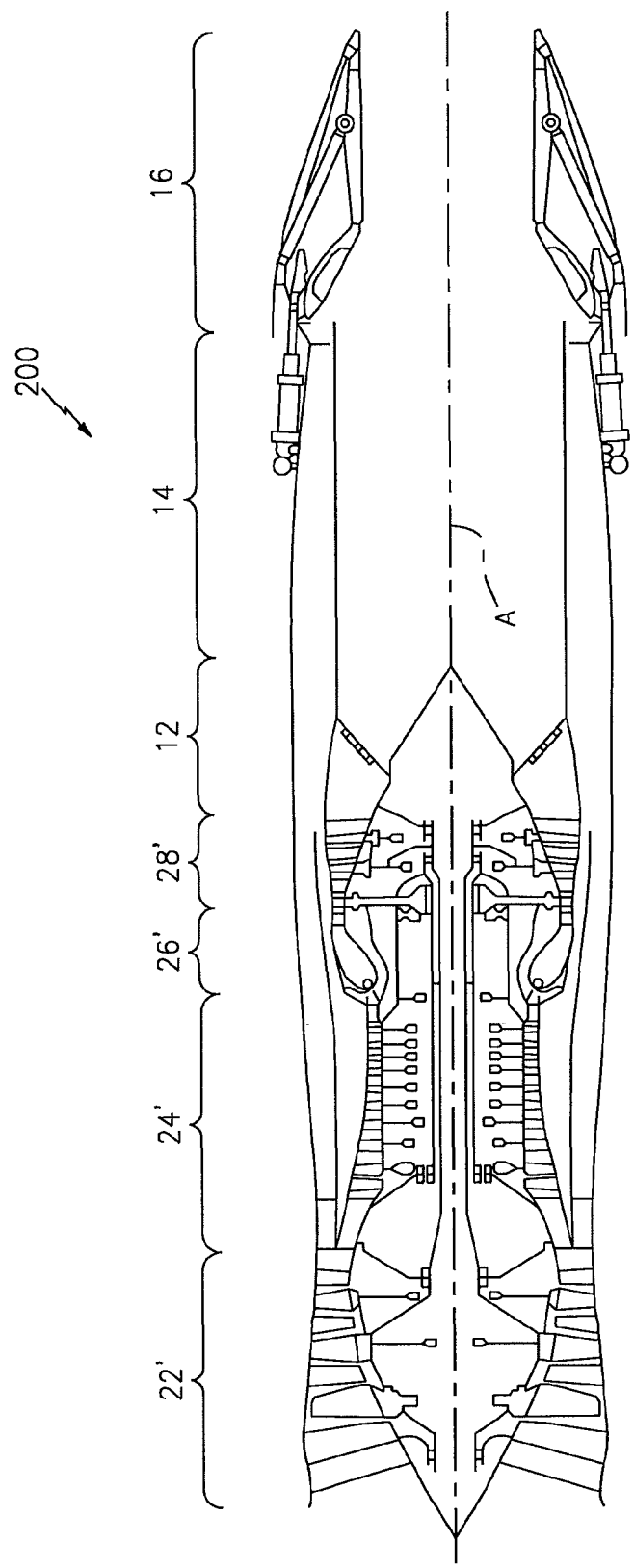
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Referring to FIG. 2, alternative engine architectures 200 might also include an augmentor section 12, an exhaust duct section 14 and a nozzle section 16 in addition to the fan section 22', compressor section 24', combustor section 26' and turbine section 28' among other systems or features. Referring again to FIG. 1, the fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between a high pressure turbine ("HPT") and a low pressure turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 as illustrated in FIG. 1 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 54 and 46 rotationally drive the respective low spool 30 and high spool 32 in response to the expansion. The main engine shafts 40 and 50 are supported at a plurality of points by the bearing structures 38 within the static structure 36. It should be understood that various bearing structures 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and the LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $(``Tram"/518.7)^{0.5}$. The Low Corrected Fan Tip Speed according to one non-limiting embodiment of the example gas turbine engine 20 is less than about 1150 fps (351 m/s).

Figure 3:
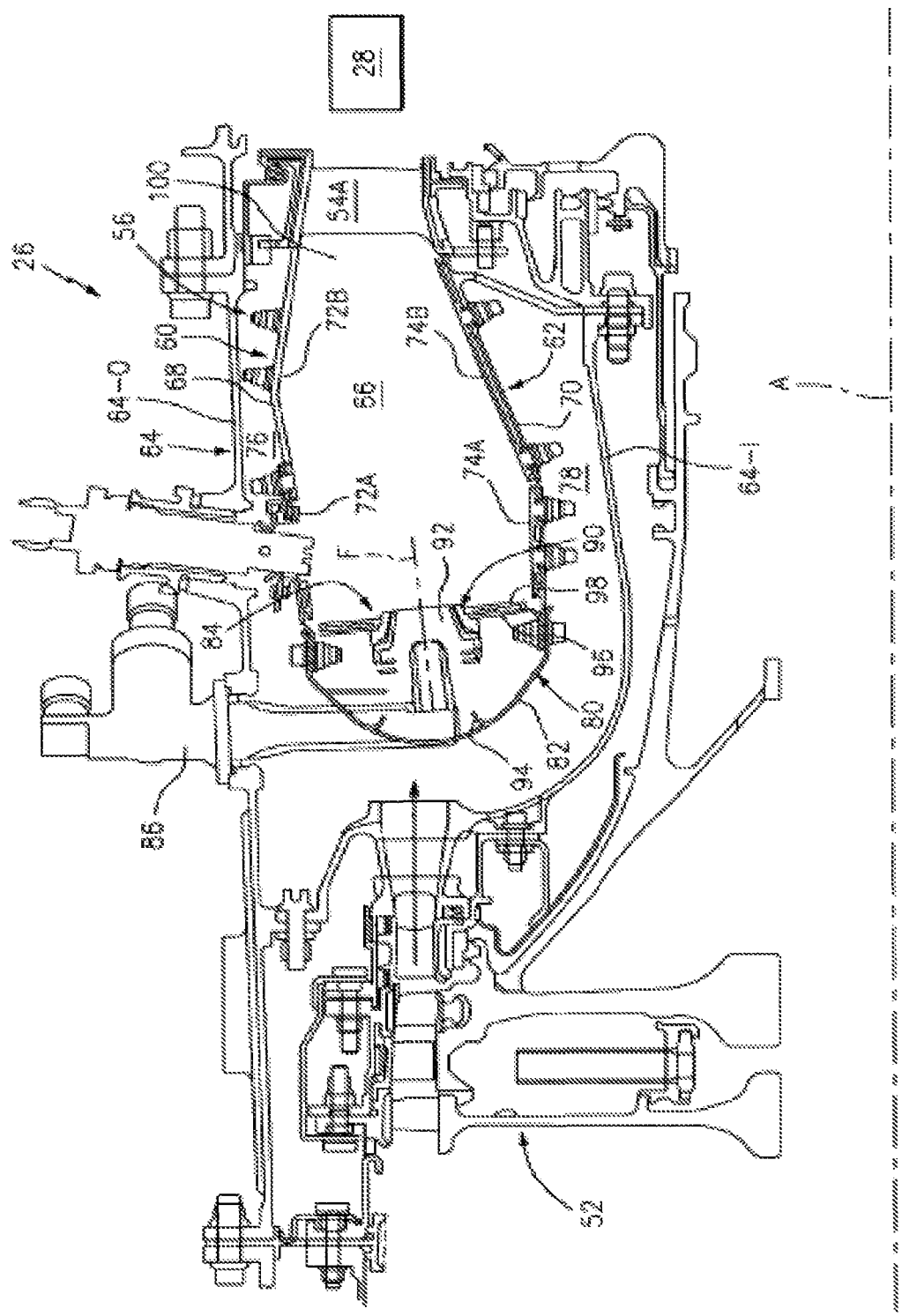
FIG. 3 is an expanded longitudinal schematic sectional view of a combustor section that may be used with the example gas turbine engine.

With reference to FIG. 3, the combustor section 26 generally includes a combustor 56 with an outer combustor liner assembly 60, an inner combustor liner assembly 62 and a diffuser case module 64. The outer combustor liner assembly 60 and the inner combustor liner assembly 62 are spaced apart such that a combustion chamber 66 is defined therebetween. The combustion chamber 66 is generally annular in shape.

The outer combustor liner assembly 60 is spaced radially inward from an outer diffuser case 64-O of the diffuser case module 64 to define an outer annular plenum 76. The inner combustor liner assembly 62 is spaced radially outward from an inner diffuser case 64-I of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor liner assemblies 60 and 62 contain the combustion products for direction toward the turbine section 28. Each combustor liner assembly 60, 62 generally includes a respective support shell 68, 70 which supports one or more liner panels 72, 74 mounted to a hot side of the respective support shell 68, 70. Each of the liner panels 72, 74 may be generally rectilinear and manufactured of, for example, a nickel based super alloy, ceramic or other temperature resistant material and are arranged to form a liner array. In one disclosed non-limiting embodiment, the liner array includes a multiple of forward liner panels 72A and a multiple of aft liner panels 72B that are circumferentially staggered to line the hot side of the outer shell 68 (also shown in FIG. 4). A multiple of forward liner panels 74A and a multiple of aft liner panels 74B are circumferentially staggered to line the hot side of the inner shell 70 (also shown in FIG. 4).

The combustor 56 further includes a forward assembly 80 immediately downstream of the compressor section 24 to receive compressed airflow therefrom. The forward assembly 80 generally includes an annular hood 82, a bulkhead assembly 84, a multiple of forward fuel nozzles 86 (one shown) and a multiple of swirlers 90 (one shown). The multiple of fuel nozzles 86 (one shown) and the multiple of swirlers 90 (one shown) define an axial fuel injection system 92 that directs the fuel-air mixture into the combustor chamber generally along an axis F.

The bulkhead assembly 84 includes a bulkhead support shell 96 secured to the combustor liner assemblies 60 and 62, and a multiple of circumferentially distributed bulkhead liner panels 98 secured to the bulkhead support shell 96. The annular hood 82 extends radially between, and is secured to, the forwardmost ends of the combustor liner assemblies 60 and 62. The annular hood 82 includes a multiple of circumferentially distributed hood ports 94 that accommodate the respective forward fuel nozzles 86 and direct air into the forward end of the combustion chamber 66 through a respective swirler 90. Each forward fuel nozzle 86 may be secured to the diffuser case module 64 and project through one of the hood ports 94 and through the respective swirler 90. Each of the fuel nozzles 86 is directed through the respective swirler 90 and the bulkhead assembly 84 along a respective axis F.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and the inner support shells 68 and 70 are mounted to a first row of Nozzle Guide Vanes (NGVs) 54A in the HPT 54 to define a combustor exit 100. The NGVs 54A are static engine components which direct core airflow combustion gases onto the turbine blades of the first turbine rotor in the turbine section 28 to facilitate the conversion of pressure energy into kinetic energy. The combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 4:
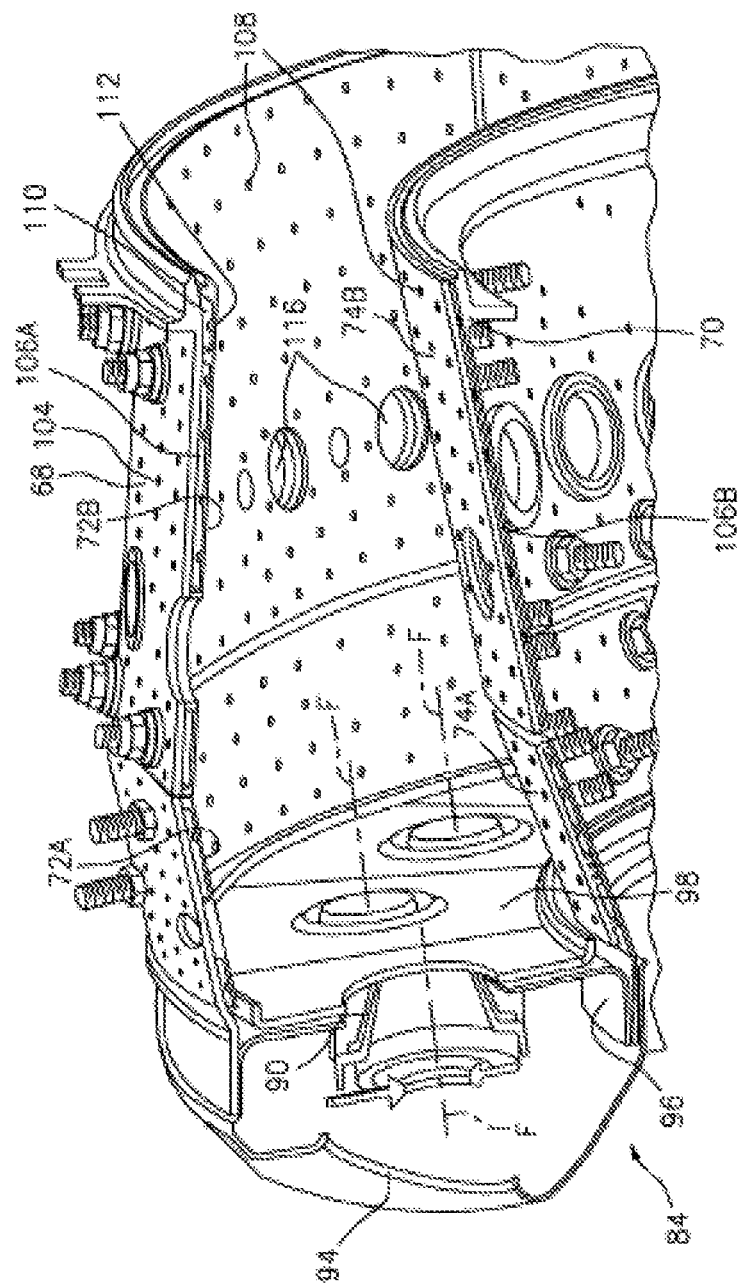
FIG. 4 is a perspective partial longitudinal sectional view of the combustor section.

With reference to FIG. 4, a multiple of cooling impingement holes 104 penetrate through the support shells 68, 70 to allow air from the respective annular plenums 76, 78 to enter cavities 106A, 106B formed in the combustor liner assemblies 60, 62 between the respective support shells 68, 70 and liner panels 72, 74. The cooling impingement holes 104 are generally normal to the surface of the liner panels 72, 74. The air in the cavities 106A, 106B provides cold side impingement cooling of the liner panels 72, 74 that is generally defined herein as heat removal via internal convection.

A multiple of cooling film holes 108 penetrate through each of the liner panels 72, 74. The geometry of the film holes (e.g., diameter, shape, density, surface angle, incidence angle, etc.) as well as the location of the holes with respect to the high temperature main flow also contributes to effusion film cooling. The liner panels 72, 74 with a combination of impingement holes 104 and film holes 108 may sometimes be referred to as an Impingement Film Floatliner liner assembly. It should be appreciated that other liner panel assemblies inclusive of a single panel.

The cooling film holes 108 allow the air to pass from the cavities 106A, 106B defined in part by a cold side 110 of the liner panels 72, 74 to a hot side 112 of the liner panels 72, 74 and thereby facilitate the formation of a film of cooling air along the hot side 112. The cooling film holes 108 are generally more numerous than the impingement holes 104 to promote the development of a film cooling along the hot side 112 to sheath the liner panels 72, 74. Film cooling as defined herein is the introduction of a relatively cooler airflow at one or more discrete locations along a surface exposed to a high temperature environment to protect that surface in the immediate region of the airflow injection as well as downstream thereof.

A multiple of dilution holes 116 may penetrate through both the respective support shells 68, 70 and liner panels 72, 74 along a common axis downstream of the forward assembly 80 to quench the hot gases by supplying cooling air radially into the combustor. That is, the multiple of dilution holes 116 provide a direct path for airflow from the annular plenums 76, 78 into the combustion chamber 66.

Figure 5:
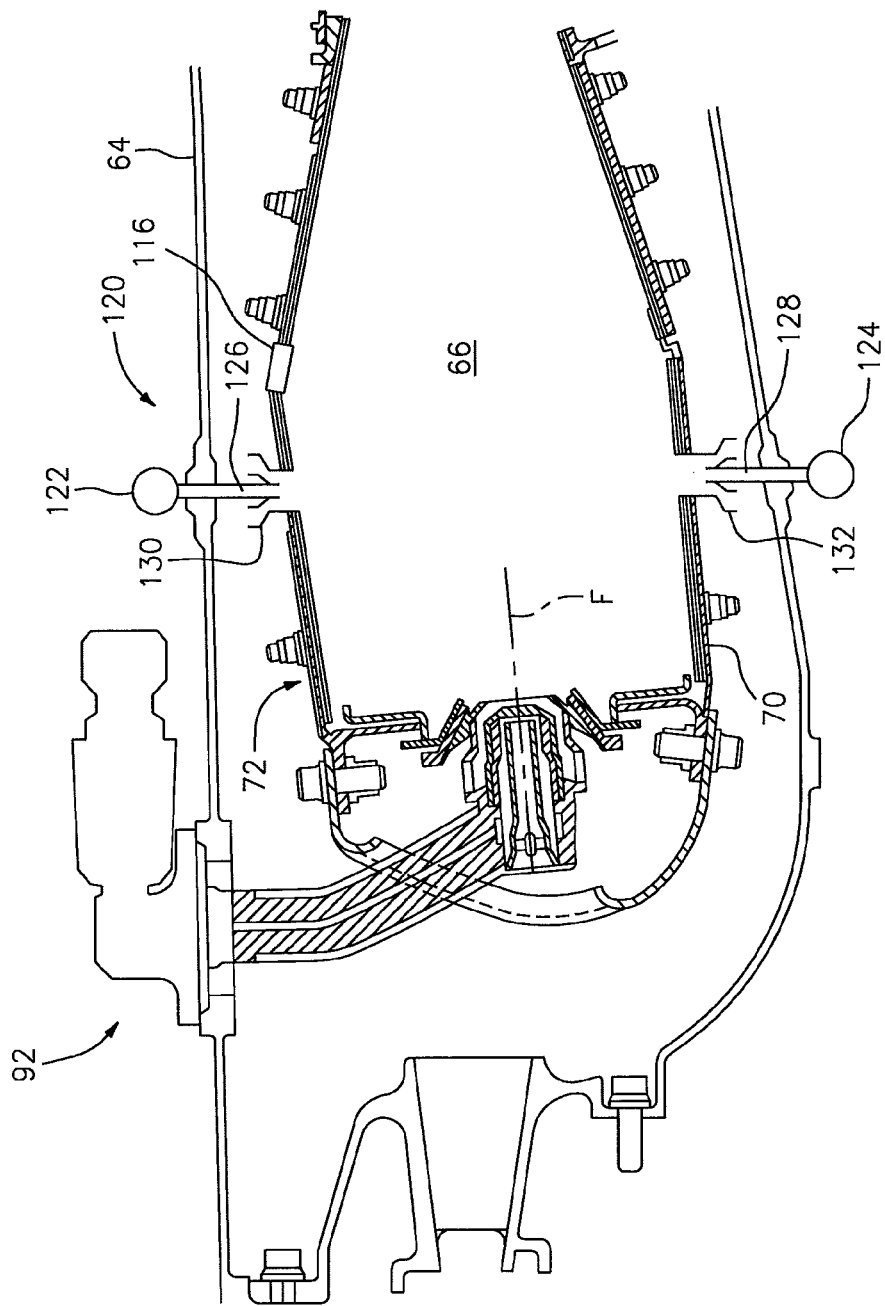
FIG. 5 is a schematic longitudinal sectional view of the combustor section which illustrates a forward axial fuel injection system and a downstream radial fuel injections system.

With reference to FIG. 5, a radial fuel injection system 120 communicates with the combustion chamber 66 downstream of the axial fuel injection system 92 generally transverse to axis F. The radial fuel injection system 120 introduces a portion of the fuel required for desired combustion performance; e.g., emissions, operability, durability as well as to lean-out the fuel contribution provided by the axial fuel injection system 92. In one disclosed non-limiting embodiment, the radial fuel injection system 120 is axially positioned downstream of the axial fuel injection system 92 and upstream of the multiple of dilution holes 116.

The radial fuel injection system 120 generally includes a radially outer fuel injection manifold 122 (illustrated schematically) and/or a radially inner fuel injection manifold 124 (illustrated schematically) with a respective multiple of outer fuel nozzles 126 and a multiple of inner fuel nozzles 128. The radially outer fuel injection manifold 122 and/or the radially inner fuel injection manifold 124 may be mounted to the diffuser case module 64 and/or to the shell 68, 70; however, various mount arrangements may alternatively or additionally provided.

Each of the multiple of outer fuel nozzles 126 and the inner fuel nozzles 128 are located within a respective mixer 130, 132 to mix the supply of fuel with the pressurized air within the diffuser case module 64. As defined herein, a "mixer" as compared to a "swirler" may generate, for example, zero swirl, a counter-rotating swirl, a specific swirl which provides a resultant swirl or a residual net swirl which may be further directed at an angle. It should be appreciated that various combinations thereof may alternatively be utilized.

The radial fuel injection system 120 may include only the radially outer fuel injection manifold 122 with the multiple of outer fuel nozzles 126; only the radially inner fuel injection manifold 124 with the multiple of inner fuel nozzles 128; or both (shown). It should be appreciated that the radial fuel injection system 120 may include single sets of outer fuel nozzles 126 and inner fuel nozzles 128 (shown) or multiple axially distributed sets of, for example, relatively smaller fuel nozzles.

Figure 6:
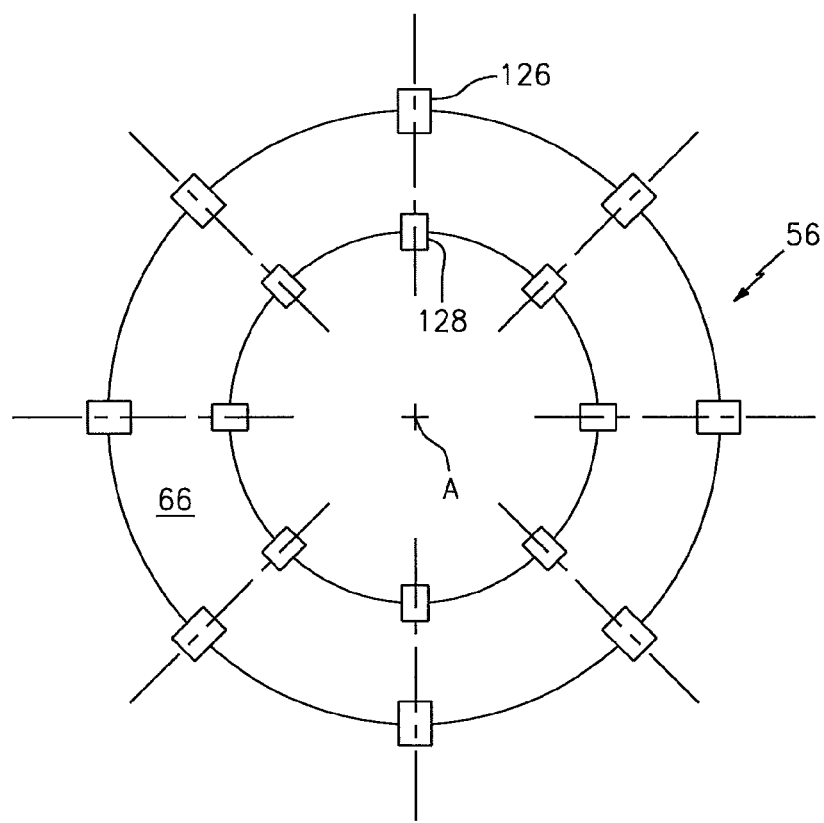
FIG. 6 is a schematic lateral sectional view of a combustor which illustrates an in-line fuel nozzle arrangement.
Figure 7:
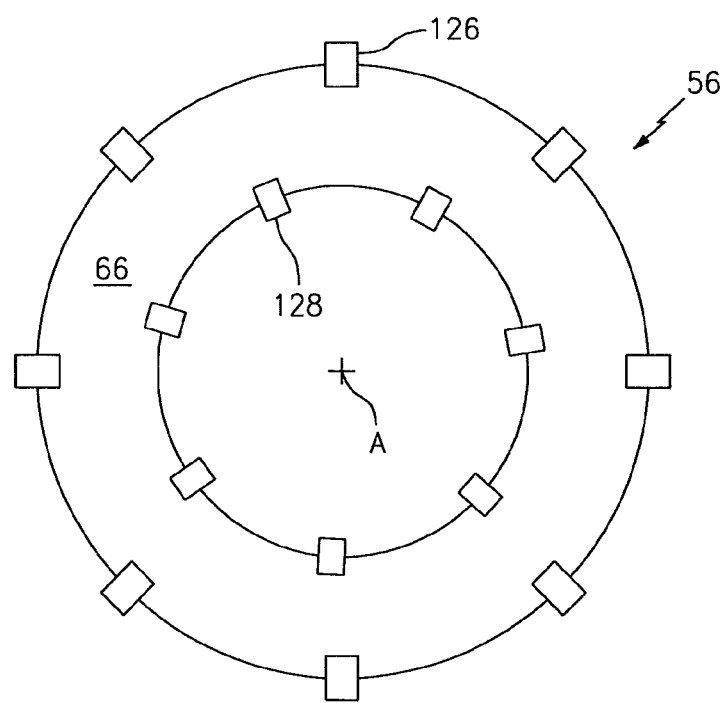
FIG. 7 is a schematic lateral sectional view of a combustor which illustrates a clocked fuel nozzle arrangement.
Figure 8:
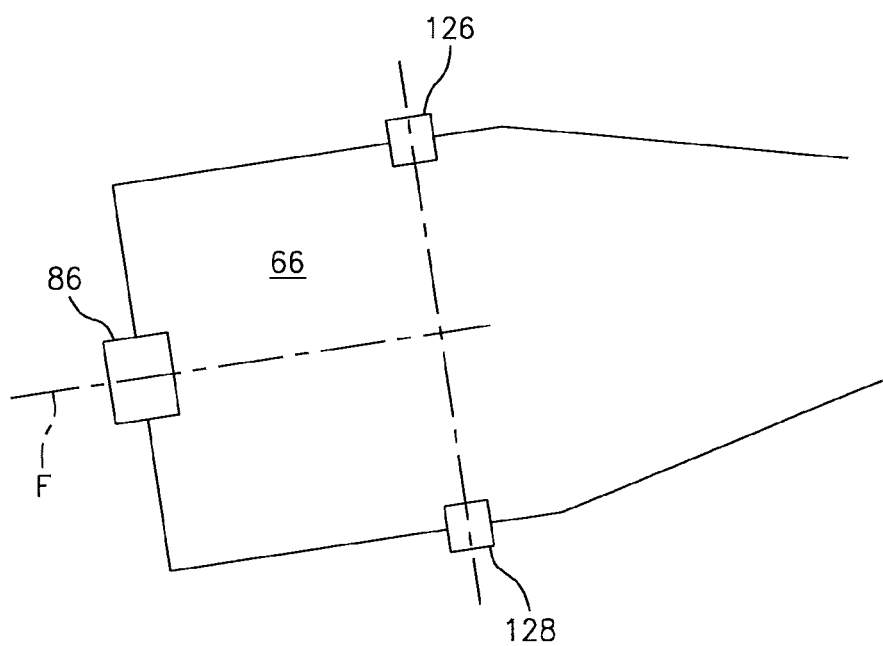
FIG. 8 is a schematic longitudinal sectional view of a combustor which illustrates a tangential fuel nozzle arrangement.
Figure 9:
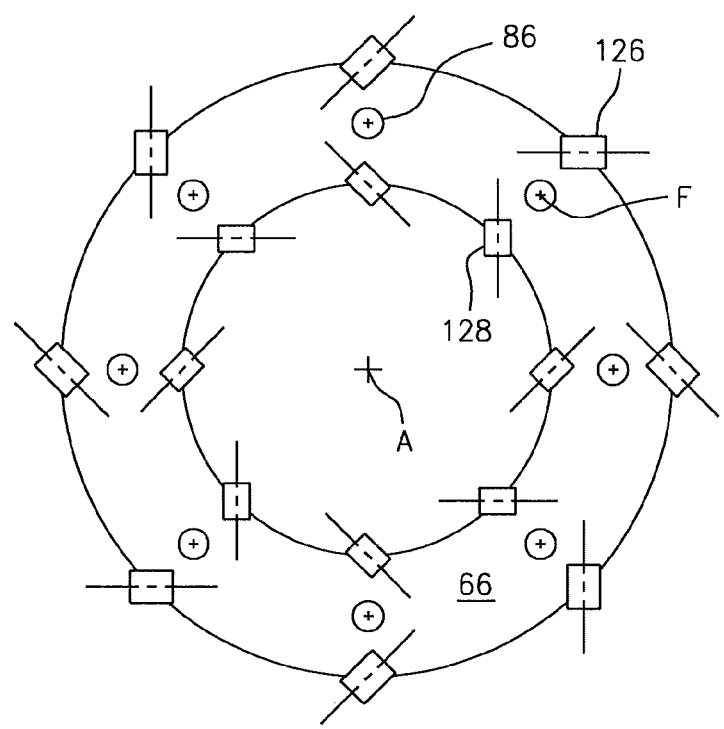
FIG. 9 is a schematic lateral sectional view of a combustor which illustrates a tangential fuel nozzle arrangement.
Figure 10:
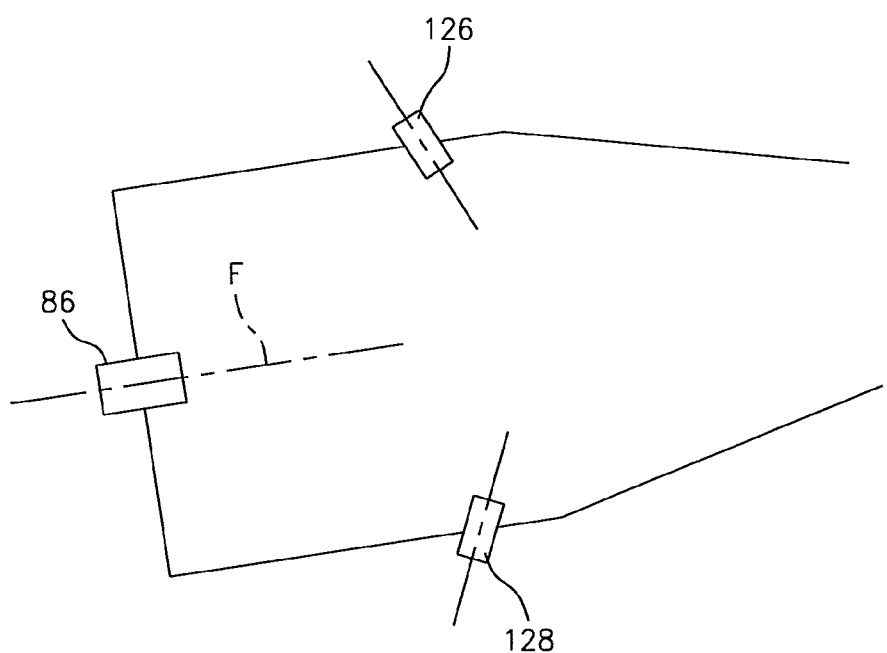
FIG. 10 is a schematic longitudinal sectional view of a combustor which illustrates an axially angled fuel nozzle arrangement.

The radial fuel injection system 120 may be circumferentially arranged in a multiple of configurations. In one disclosed non-limiting embodiment, the multiple of outer fuel nozzles 126 and the multiple of inner fuel nozzles 128 are circumferentially arranged so that the nozzles 126, 128 are directly opposed (see FIG. 6). In another disclosed non-limiting embodiment, the multiple of outer fuel nozzles 126 and the multiple of inner fuel nozzles 128 are circumferentially staggered so that the nozzles 126, 128 are not directly opposed (see FIG. 7). Furthermore, the nozzles 126, 128 may be angled perpendicularly (see FIG. 8), tangentially (see FIG. 9), or at an angle such as downstream (see FIG. 10) relative to the cross flow from the fuel nozzles 86 of the axial fuel injection system 92 that are directed along axis F.

Figure 11:
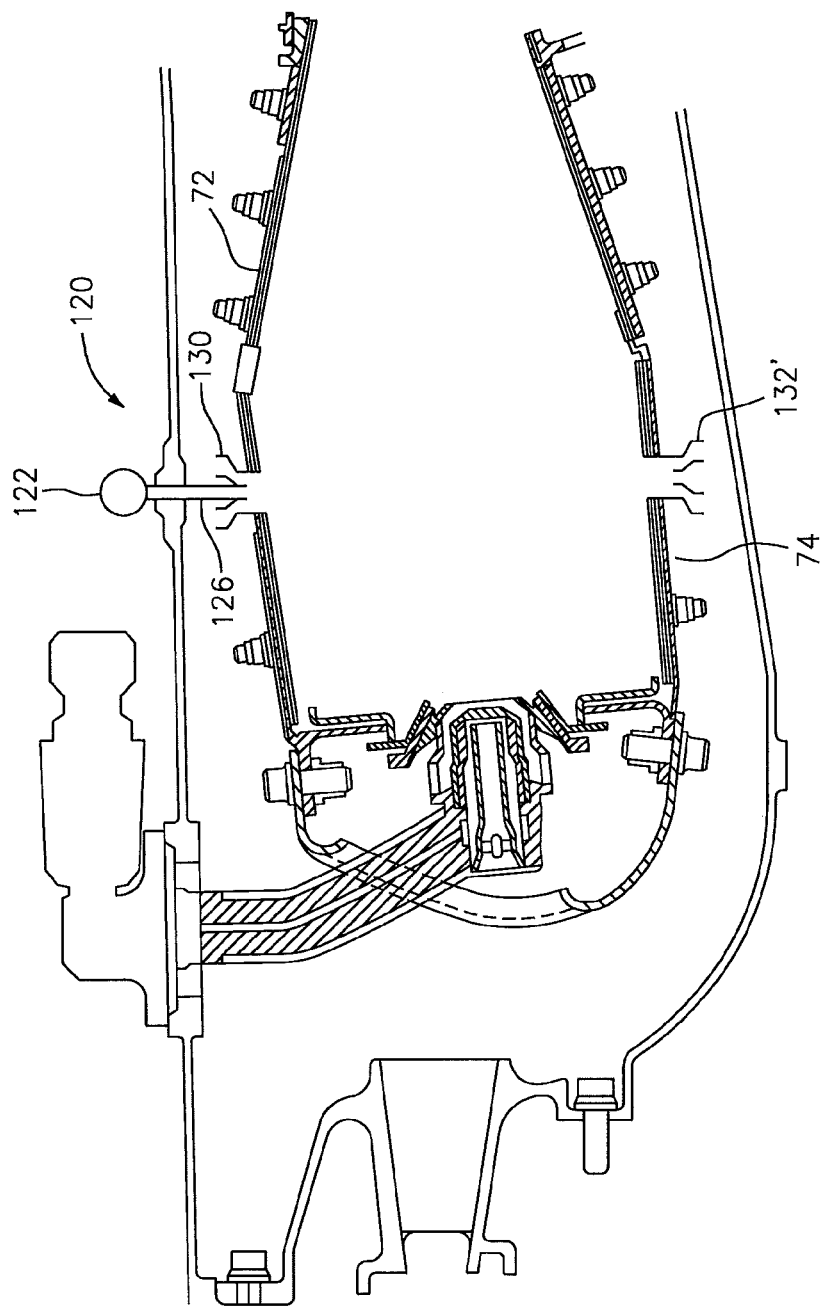
FIG. 11 is a schematic longitudinal sectional view of another combustor which illustrates an outer radial fuel injection system arrangement.

Alternatively still, the multiple of outer fuel nozzles 126 may be positioned through the outer liner 72 opposite or staggered relative to a non-fueled mixer 132' on the inner liner 74 (see FIG. 11). That is, the non-fueled mixer 132' provides airflow but not fuel.

Figure 12:
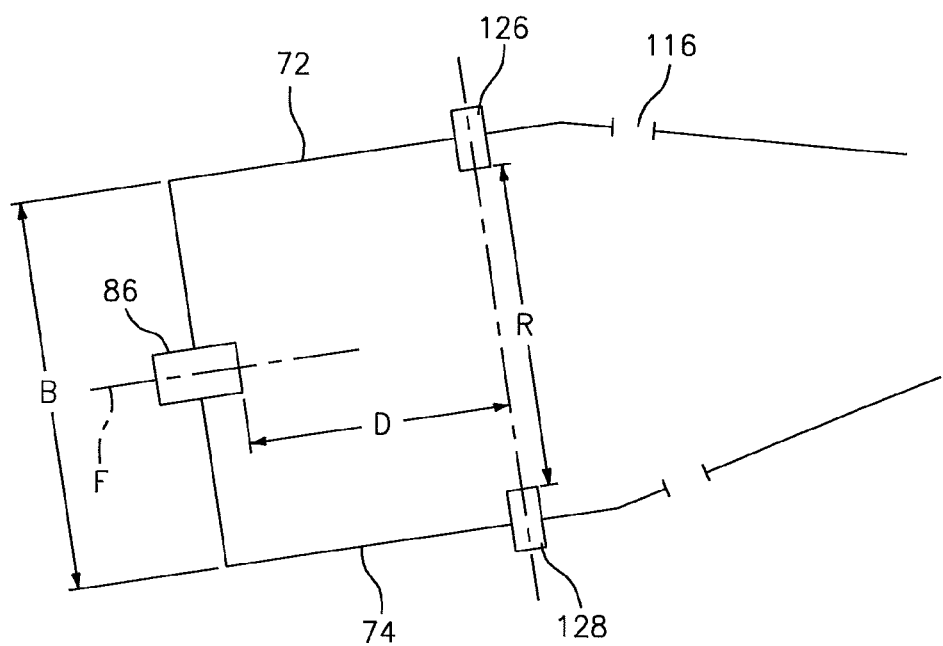
FIG. 12 is a schematic longitudinal sectional view of a combustor which illustrates a relationship between the axial and radial fuel injection systems.

With respect to FIG. 12, the forward fuel nozzles 86 are circumferentially spaced apart between about eighty percent (80%) and about two hundred percent (200%) of a bulkhead height B. The bulkhead height B as defined herein is the radial distance between the liner panels 72, 74 at the forward end of the combustion chamber 66 at the bulkhead liner panels 98 of bulkhead assembly 84. The multiple of outer fuel nozzles 126 and the inner fuel nozzles 128 are axially spaced a distance D between about fifty percent (50%) and about one hundred and fifty percent (150%) of the bulkhead height B aft of the forward fuel nozzles 86.

Figure 13:
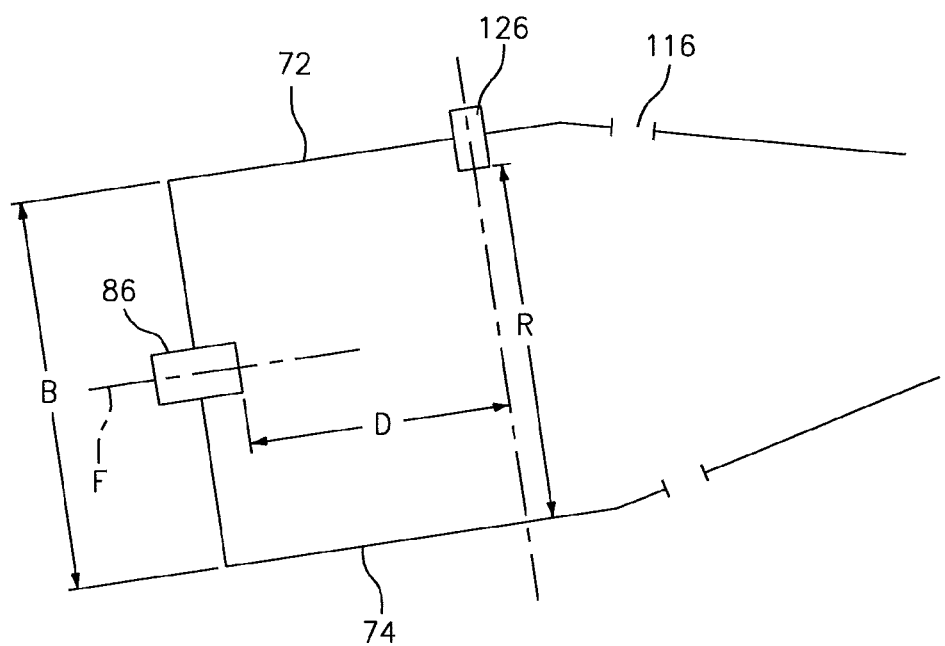
FIG. 13 is a schematic longitudinal sectional view of a combustor which illustrates a relationship between the axial and radial fuel injection systems.
Figure 14:
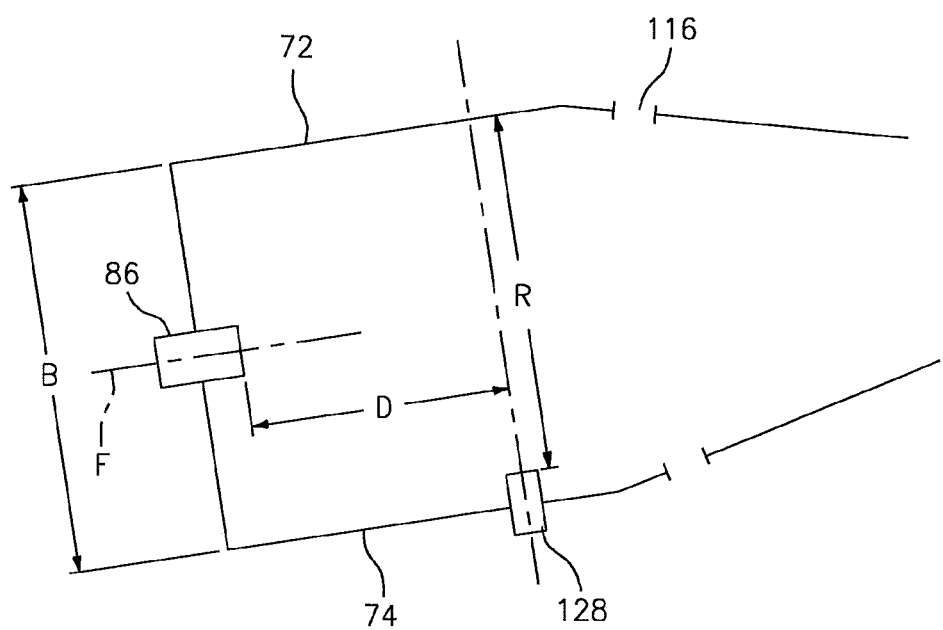
FIG. 14 is a schematic longitudinal sectional view of a combustor which illustrates a relationship between the axial and radial fuel injection systems.

The multiple of outer fuel nozzles 126 are radially spaced a distance R from the inner fuel nozzles 128 at between about one hundred percent (100%) and about two hundred percent (200%) of the bulkhead height B. It should be understood that the distance R may be with respect to the liner panels 72, 74 should the radial fuel injection system 120 only utilize outer fuel nozzles 126 (see FIG. 13) or inner fuel nozzles 128 (see FIG. 14).

Figure 15:
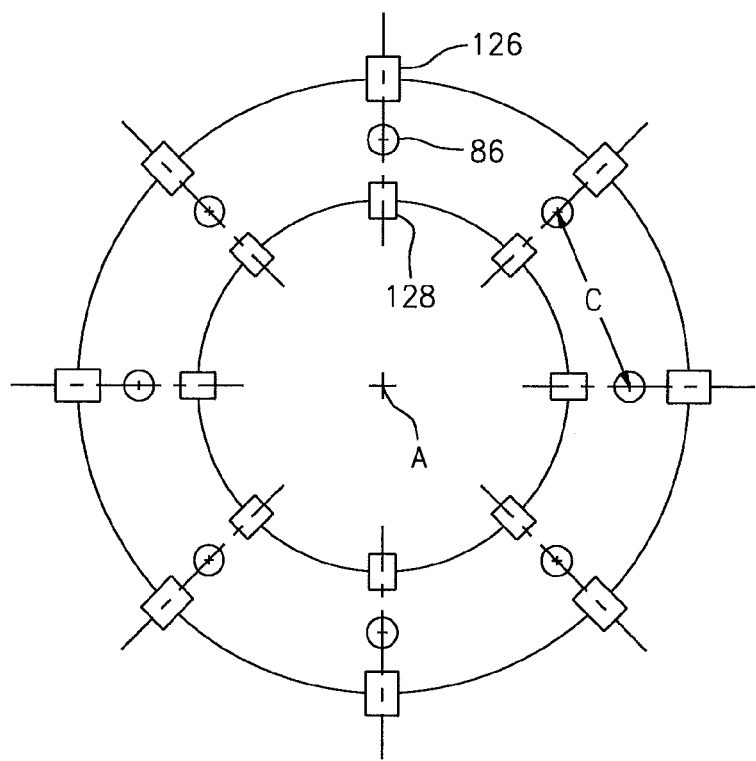
FIG. 15 is a schematic lateral sectional view of a combustor which illustrates a relationship between the axial and radial fuel injection systems.
Figure 16:
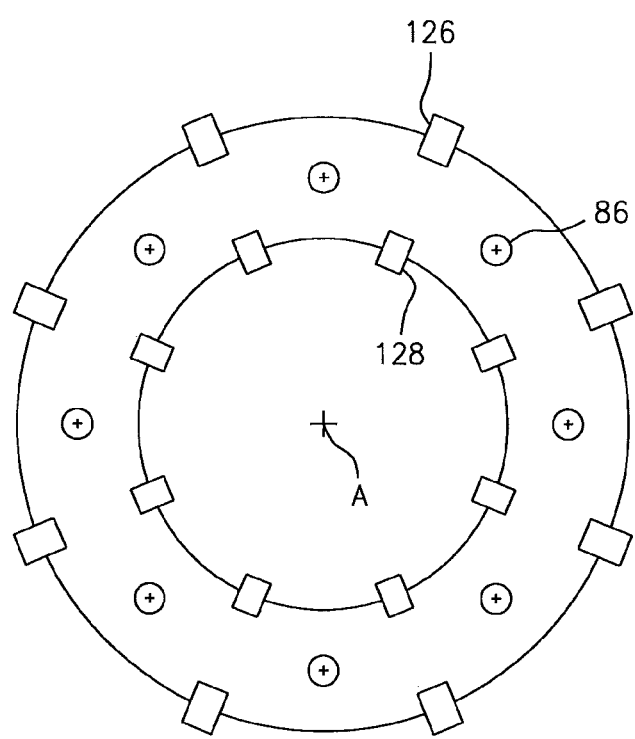
FIG. 16 is a schematic lateral sectional view of a combustor which illustrates a relationship between the axial and radial fuel injection systems.

With respect to FIG. 15, the multiple of outer fuel nozzles 126 and multiple of inner fuel nozzles 128 may be arranged circumferentially in-line with the forward fuel nozzles 86. Alternatively, the multiple of outer fuel nozzles 126 and/or the multiple of inner fuel nozzles 128 may be arranged circumferentially between the forward fuel nozzles 86 at, for example, quarter pitch (see FIG. 16). The multiple of outer fuel nozzles 126 and/or the multiple of inner fuel nozzles 128 may be spaced apart a distance C of between about twenty-five percent (25%) and about one hundred percent (100%) of the bulkhead height B circumferentially, which alternatively, may be defined as about 1.5-5 fuel jet diameters. It should be appreciated that various circumferential and other relationships may be utilized and that fuel jet diameter and bulkhead sizing are but examples thereof.

Figure 17:
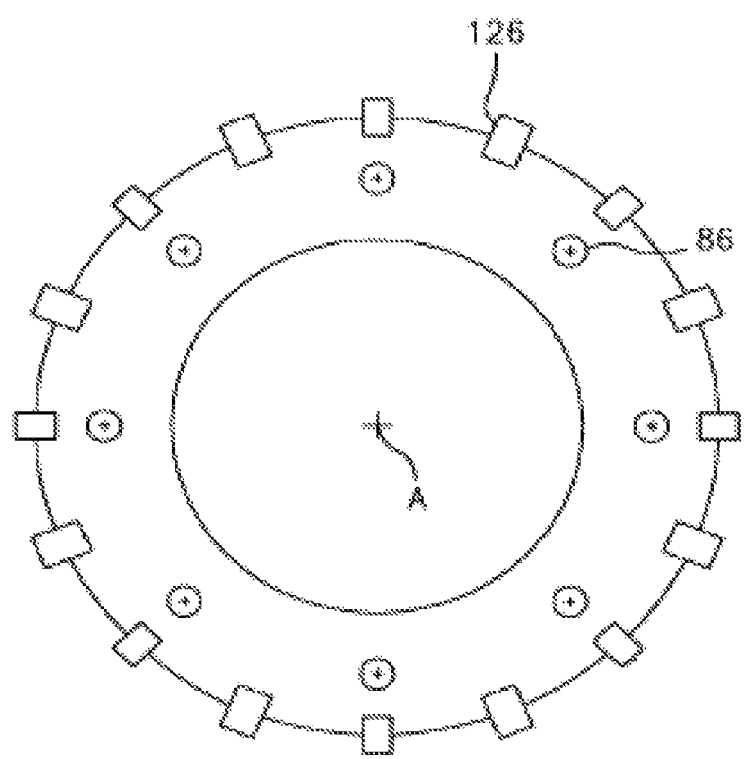
FIG. 17 is a schematic lateral sectional view of a combustor which illustrates the axial and radial fuel injection systems that include a numerically different relationship.

Alternatively still, with respect to FIG. 17, the multiple of outer fuel nozzles 126 may be more numerous than the forward fuel nozzles 86. In this disclosed non-limiting embodiment, twice the number of outer fuel nozzles 126 are provided as compared to the forward fuel nozzles 86. The multiple of outer fuel nozzles 126 include both in-line and circumferentially distributed forward fuel nozzles 86.

Figure 18:
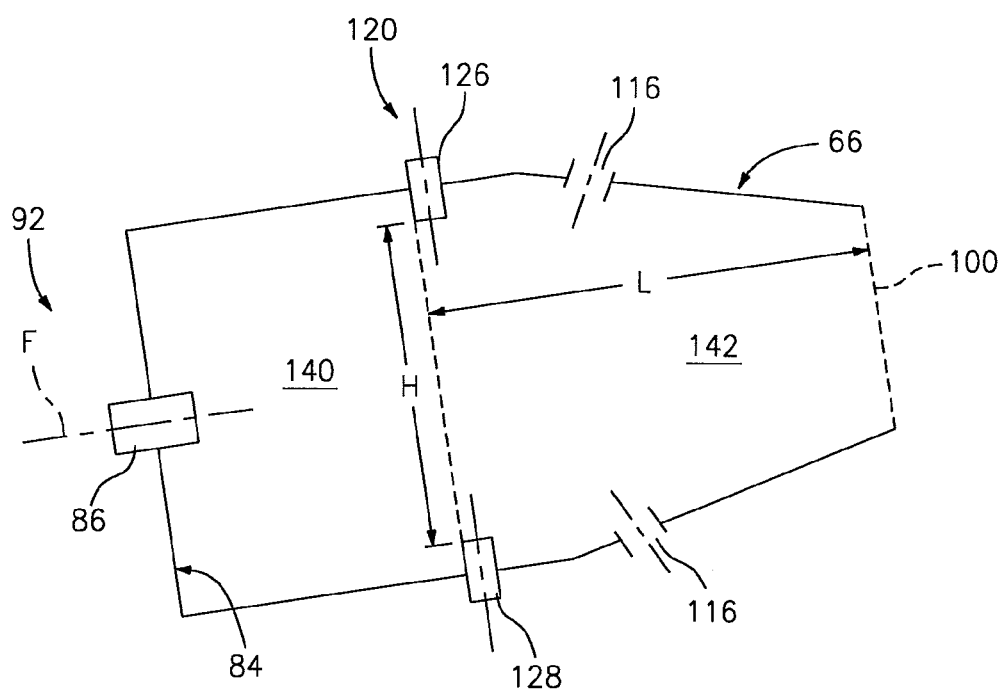
FIG. 18 is a schematic longitudinal sectional view of a combustor which illustrates a relationship between the axial and radial fuel injection systems.

With reference to FIG. 18, the axial fuel injection system 92, the radial fuel injection system 120 and the multiple of dilution holes 116 define a forward combustion zone 140 axially between the bulkhead assembly 84 and the forward section of the radial fuel injection system 120, as well as a downstream combustion zone 142 between the forward section of the radial fuel injection system 120 and the combustor exit 100. The downstream combustion zone 142 is axially proximate the multiple of dilution holes 116.

In one disclosed non-limiting embodiment, the axial fuel injection system 92 provides about ten percent (10%) to about thirty-five percent (35%) of the combustor airflow, the radial fuel injection system 120 provides about thirty percent (30%) to about sixty percent (60%) of combustor airflow while the multiple of dilution holes 116 provide about five percent (5%) to about twenty percent (20%) of the combustor airflow. It should be appreciated that these ranges of combustor airflow may define a total combustor airflow less than one hundred percent (100%) with the remainder being cooling airflow. It should be further appreciated that generally as the combustor airflow from the axial fuel injection system 92 increases, the radial fuel injection system 120 decreases and vice-versa with the balance being from the multiple of dilution holes 116. In one specific example, the axial fuel injection system 92 provides about twenty percent (20%) of the combustor airflow, the radial fuel injection system 120 provides about forty-five percent (45%) of combustor airflow while the multiple of dilution holes 116 provide about ten percent (10%) of the combustor airflow with the remainder being cooling airflow.

In one disclosed non-limiting embodiment, the forward combustion zone 140 defines about twenty percent (20%) to about fifty percent (50%) of the total combustor chamber 66 volume and the downstream combustion zone 142 defines about fifty percent (50%) to about eighty percent (80%) of the total combustor chamber 66 volume.

In one disclosed non-limiting embodiment, the downstream combustion zone 142 forms an axial length L of about one hundred percent (100%) to about two hundred and fifty percent (250%) a height H of the combustion chamber 66 between the liners 72, 74 at the radial fuel injection system 120 location. The height H as defined herein is the radial distance between the liner panels 72, 74 within the combustion chamber 66 proximate the radial fuel injection system 120 location. It should be appreciated that various combinations of the above-described geometries may be provided.

In operation, a fuel-rich combustion environment in the forward combustion zone 140 is provided for low power operation. During high power operation, a fuel-lean combustion environment is provided in both the forward combustion zone 140 and the downstream combustion zone 142. During engine idle, the method includes the step of selectively distributing the fuel being supplied between the forward combustion zone 140 and the downstream combustion zone 142 with eighty percent (80%) to one hundred percent (100%) as the axial fuel injection system 92 of fuel and with zero (0%) to twenty percent (20%) as the radial fuel injection system 120 flow of fuel. During engine approach, forty percent (40%) to one hundred percent (100%) as the flow of fuel may be supplied by the axial fuel injection system 92 and zero (0%) to sixty percent (60%) by the radial fuel injection system 120. At higher power operation of the gas turbine engine, fifteen percent (15%) to fifty percent (50%) of the flow of fuel is supplied by the axial fuel injection system 92 with fifty percent (50%) to eighty-five percent (85%) from the radial fuel injection system 120. Higher power operation of the gas turbine engine includes engine operation at cruise, engine operation at climb, and engine operation at take-off.

The gas turbine combustor and the method for operating the gas turbine combustor as disclosed herein provides for lower $NO_x$ emissions at low, mid and high power operation at generally equivalent weight and operability relative to a typical conventional gas turbine combustor. At low power, such as idle and approach, the forward combustion zone 140 may be robustly fueled to establish a fuel-rich combustion environment and provide ignition, combustion stability, and low emissions. When power increases (e.g. during cruise, climb and take-off), fuel flow to the downstream combustion zone 142 increases and fuel flow to the forward combustion zone 140 decreases whereby both combustion zones operate fuel lean in order to control $NO_x$ formation. The increased temperature of the combustion gases from the forward combustion zone 140 flow across the downstream combustion zone 142 to further facilitate stable combustion in the downstream zone and achievement of high combustion efficiency.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A turbofan gas turbine engine combustor, comprising:
a first fuel injection system that directs a first fuel-air mixture generally along an axis of a combustion chamber, said first fuel injection system operable to supply between ten percent and thirty-five percent of a combustion airflow;
a second fuel injection system that directs a second fuel-air mixture into said combustion chamber downstream of and in cross-flow arrangement with said first fuel injection system, said second fuel injection system operable to supply between thirty percent and sixty percent of said combustion airflow;
a multiple of dilution holes in communication with said combustion chamber downstream of said second fuel injection system, said multiple of dilution holes operable to supply between five percent and twenty percent of said combustion airflow;
an inner liner;
an outer liner; and
a forward assembly between said inner liner and said outer liner,
wherein said forward assembly includes a bulkhead liner that defines a bulkhead height, and
wherein said inner liner and said outer liner are radially spaced between one hundred percent and two hundred percent of said bulkhead height axially proximate to said second fuel injection system.

2. The combustor as recited in claim 1, wherein said second fuel injection system is radially outboard and radially inboard of said combustion chamber.

3. The combustor as recited in claim 1, wherein said second fuel injection system includes a multiple of non-fueled mixers.

4. The combustor as recited in claim 1, wherein said second fuel injection system is radially outboard of said combustion chamber.

5. The combustor as recited in claim 1, wherein said combustion chamber is defined between said inner liner and said outer liner, and wherein said second fuel injection system is axially spaced between fifty percent and one hundred and fifty percent of said bulkhead height aft of said bulkhead liner.

6. The combustor as recited in claim 1, wherein said first fuel injection system includes a multiple of forward fuel nozzles and said second fuel injection system includes a multiple of radial fuel nozzles, and wherein said multiple of radial fuel nozzles are spaced between twenty-five percent and one hundred percent of said bulkhead height apart circumferentially.

7. The combustor as recited in claim 1, wherein said first fuel injection system includes a multiple of forward fuel nozzles and said second fuel injection system includes a multiple of radial fuel nozzles, and wherein said multiple of forward fuel nozzles are circumferentially in-line with respect to said multiple of radial fuel nozzles.

8. The combustor as recited in claim 1, wherein said first fuel injection system includes a multiple of forward fuel nozzles and said second fuel injection system includes a multiple of radial fuel nozzles, and wherein said multiple of forward fuel nozzles are circumferentially offset with respect to said multiple of radial fuel nozzles.

9. The combustor as recited in claim 1, wherein a forward combustion zone is defined forward of said second fuel injection system and a downstream combustion zone is defined aft of said second fuel injection system, and wherein said forward combustion zone defines twenty percent to fifty percent of a total volume of said combustion chamber and said downstream combustion zone defines fifty percent to eighty percent of said total volume of said combustion chamber.

10. The combustor as recited in claim 1, wherein a forward combustion zone is defined forward of said second fuel injection system and a downstream combustion zone is defined aft of said second fuel injection system, and wherein said downstream combustion zone forms an axial length of one hundred percent to two hundred and fifty percent a height of said combustion chamber proximate said second fuel injection system.

11. A turbofan gas turbine engine combustor, comprising:
a first fuel injection system in communication with a combustion chamber;
a second fuel injection system that communicates with said combustion chamber downstream of said first fuel injection system to define a forward combustion zone forward of said second fuel injection system and a downstream combustion zone aft of said second fuel injection system, wherein said forward combustion zone defines twenty percent to fifty percent of a total volume of said combustor chamber and said downstream combustion zone defines fifty percent to eighty percent of said total volume of said combustor chamber;
an inner liner;
an outer liner; and
a forward assembly between said inner liner and said outer liner,
wherein said forward assembly includes a bulkhead liner that defines a bulkhead height, and
wherein said inner liner and said outer liner are radially spaced between one hundred percent and two hundred percent of said bulkhead height axially proximate to said second fuel injection system.

12. The combustor as recited in claim 11, wherein said downstream combustion zone forms an axial length of one hundred percent to two hundred and fifty percent of a radial height of said combustion chamber proximate said second fuel injection system.

13. The combustor as recited in claim 11, wherein said first fuel injection system is operable to supply between ten percent and thirty-five percent of a combustion airflow, and wherein said second fuel injection system is operable to supply between thirty percent and sixty percent of said combustion airflow.

14. The combustor as recited in claim 13, further comprising a multiple of dilution holes in communication with a combustion chamber downstream of said second fuel injection system, wherein said multiple of dilution holes are operable to supply between five percent and twenty percent of said combustion airflow.

15. A turbofan gas turbine engine combustor, comprising:
a first fuel injection system in communication with a combustion chamber; and
a second fuel injection system that communicates with said combustion chamber downstream of said first fuel injection system to define a forward combustion zone forward of said second fuel injection system and a downstream combustion zone aft of said second fuel injection system, wherein said downstream combustion zone forms an axial length of one hundred percent to two hundred and fifty percent of a radial height of said combustion chamber proximate said second fuel injection system;
an inner liner;
an outer liner; and
a forward assembly between said inner liner and said outer liner,
wherein said forward assembly includes a bulkhead liner that defines a bulkhead height, and
wherein said inner liner and said outer liner are radially spaced between one hundred percent and two hundred percent of said bulkhead height axially proximate to said second fuel injection system.

16. The combustor as recited in claim 15, further comprising a multiple of dilution holes in communication with a combustion chamber downstream of said second fuel injection system, wherein said multiple of dilution holes are operable to supply between five percent and twenty percent of a combustion airflow.

17. The combustor as recited in claim 16, wherein said first fuel injection system is operable to supply between ten percent and thirty-five percent of said combustion airflow, and wherein said second fuel injection system is operable to supply between thirty percent and sixty percent of said combustion airflow.

18. The combustor as recited in claim 1, wherein said second fuel injection system is at least one of angled perpendicularly, angled tangentially or at an angle relative to a flow of the first fuel-air mixture from said first fuel injection system.

19. The combustor as recited in claim 1, wherein the turbofan gas turbine engine combustor is for an aircraft gas turbine engine.

20. The combustor as recited in claim 1, wherein said second fuel injection system directs said second fuel-air mixture into said combustion chamber at an angle that is tangential to said axis of said combustion chamber.

* * * * *